(12) United States Patent
Schropp et al.

(10) Patent No.: US 10,314,234 B2
(45) Date of Patent: Jun. 11, 2019

(54) GUIDE ASSEMBLY FOR A LATERAL DRAPER OF A HEADER FOR AN AGRICULTURAL HARVESTER

(71) Applicant: CNH Industrial America, LLC, New Holland, PA (US)

(72) Inventors: Kyle Schropp, Mount Joy, PA (US); Craig Roberts, Denver, PA (US); Andrew Lauwers, Sandusky, OH (US); Blaine Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/650,104

(22) Filed: Jul. 14, 2017

(65) Prior Publication Data

US 2019/0014720 A1    Jan. 17, 2019

(51) Int. Cl.
*A01D 61/02* (2006.01)
*A01D 41/12* (2006.01)
*A01D 57/20* (2006.01)
*B65G 15/30* (2006.01)
*A01D 41/14* (2006.01)

(52) U.S. Cl.
CPC ............. *A01D 61/02* (2013.01); *A01D 41/12* (2013.01); *A01D 41/14* (2013.01); *A01D 57/20* (2013.01); *B65G 15/30* (2013.01)

(58) Field of Classification Search
CPC ...... B65G 15/30; B65G 15/46; B65G 17/067; B65G 39/071; A01D 57/20; A01D 61/002; A01D 61/02; A01D 41/12
USPC ................................. 192/841, 840
See application file for complete search history.

(56) References Cited

U.S. PATENT DOCUMENTS

| 2,347,365 | A |   | 4/1944 | Paradise |   |
|---|---|---|---|---|---|
| 3,724,646 | A |   | 4/1973 | Kornylak |   |
| 3,941,238 | A | * | 3/1976 | Lapeyre | B65G 15/46 198/635 |
| 4,008,801 | A | * | 2/1977 | Reilly | B65G 15/46 198/837 |
| 4,077,510 | A |   | 3/1978 | Muller |   |
| 4,225,036 | A | * | 9/1980 | Michael | B65G 15/46 198/840 |

(Continued)

FOREIGN PATENT DOCUMENTS

| CA | 2311019 A1 | 12/2001 |   |
|---|---|---|---|
| DE | 2609043 A1 * | 9/1977 | ............... F16G 1/28 |

(Continued)

OTHER PUBLICATIONS

Extended European Search Report for EP18182470.7 dated Nov. 21, 2018, 7 pages.

*Primary Examiner* — Arpad Fabian-Kovacs
(74) *Attorney, Agent, or Firm* — Peter K. Zacharias; Patrick M. Sheldrake

(57) ABSTRACT

A guide assembly for a lateral draper belt of a header of an agricultural harvester is provided. The guide assembly includes a first elongated guide for connecting to the header and a second elongated guide for connecting to the header. The first elongated guide has a slot defined by three inner surfaces for receiving a first complementary shaped draper belt portion of the later draper belt. The second elongated guide has a slot defined by seven inner surfaces for receiving a second complementary shaped draper belt portion of the lateral draper belt.

17 Claims, 5 Drawing Sheets

(56) References Cited

U.S. PATENT DOCUMENTS

| | | | |
|---|---|---|---|
| 6,351,931 B1 | 3/2002 | Shearer | |
| 7,472,533 B2 | 1/2009 | Talbot et al. | |
| 7,543,428 B1 | 6/2009 | Puryk et al. | |
| 7,673,741 B2 | 3/2010 | Nemedi | |
| 7,908,836 B1 | 3/2011 | Rayfield et al. | |
| 7,926,248 B2 | 4/2011 | Schmidt et al. | |
| 8,151,547 B2 | 4/2012 | Bich et al. | |
| 8,291,686 B1 * | 10/2012 | Cormier | A01D 61/002 56/181 |
| 8,484,938 B2 * | 7/2013 | Cormier | A01D 61/006 56/181 |
| 9,185,844 B2 | 11/2015 | Schroeder | |
| 2008/0092508 A1 * | 4/2008 | Talbot | A01D 57/20 56/181 |
| 2010/0313540 A1 * | 12/2010 | Sauerwein | A01D 41/14 56/181 |
| 2011/0315524 A1 * | 12/2011 | Kidd | A01D 61/02 198/837 |
| 2014/0041354 A1 | 2/2014 | Coon et al. | |
| 2014/0196427 A1 | 7/2014 | Fuechtling | |

FOREIGN PATENT DOCUMENTS

| | | |
|---|---|---|
| EP | 2502484 A1 | 9/2012 |
| FR | 2313542 A1 | 12/1976 |

\* cited by examiner

GUIDE ASSEMBLY FOR A LATERAL DRAPER OF A HEADER FOR AN AGRICULTURAL HARVESTER

FIELD OF THE INVENTION

The following exemplary embodiments of the present invention relate generally to a header of a plant cutting machine (e.g., a combine harvester) and, more specifically, to a header having a guide assembly for use with a lateral draper belt assembly.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing plants or crops via, for example, an elongate sickle mechanism that reciprocates sidewardly relative to a non-reciprocating guard structure or a row unit with gathering chains and deck plates.

After crops are cut, they are collected inside the header and transported via draper belts toward a feederhouse located centrally inside the header. To help facilitate cutting crops, headers are often designed to allow the cutter bar to flex or pivot to accommodate any change in terrain so that the cutter bar can better track the surface. However, unlike the cutter bar, a conventional draper belt is not configured to flex to match motion of the cutter bar. Consequently, when the cutter bar flexes, the cut crop may not properly lay on the draper belt which can create wasted and/or uncollected crop.

Furthermore, as crops are cut and transported to the draper belt, debris may also be pulled along with the crop. The debris, or even portions of the cut crop itself, may lodge itself into the gaps between the draper belts and the cutter bar. This can potentially cause significant damage to the operation and life of the cutter bars, draper belts, or other components of the header's inner machinations.

Therefore, what is desired is a header that is capable of accommodating for changes in terrain while still maintaining efficient crop gathering. When the disclosed exemplary embodiments are is used in combination with an agricultural harvester, the exemplary embodiment overcome one more of the disadvantages referenced above by providing a header having a guide assembly connectable to the draper belt assembly for guiding and sealing the draper belt.

BRIEF SUMMARY OF THE INVENTION

In accordance with an exemplary embodiment, there is provided a guide assembly for a lateral draper belt of a header of an agricultural harvester comprising a first elongated guide and a second elongated guide. The first elongated guide is connectable to the header and has a slot defined by three inner surfaces for receiving a first complementary shaped draper belt portion of the lateral draper belt. The second elongated guide is connectable to the header and has a slot defined by seven inner surfaces for receiving a second complementary shaped draper belt portion of the lateral draper belt.

An aspect of this exemplary embodiment is that the slot of the first elongated guide is substantially U-shaped or substantially hook-shaped, and the slot of the second elongated guide is substantially T-shaped. The slot of the first elongated guide is configured to substantially engage three sides of the first complementary shaped draper belt portion. The guide assembly further comprises a seal coextensive with the slot of the first elongated guide for forming a sealing connection between the lateral draper belt portion and the slot. The seal is formed from a plurality of bristles.

Another aspect of this exemplary embodiment is that the second elongated guide can be formed from a plurality of spaced apart guide segments each having a slot defined by seven inner surfaces for receiving the second complementary shaped draper belt portion of the lateral draper belt. The guide assembly further comprises a third elongated guide for connecting to the header, the third elongated guide having a slot defined by seven inner surfaces for receiving a third complementary shaped draper belt portion of the lateral draper belt, wherein the third elongated guide is spaced from and substantially parallel to the second elongated guide.

In accordance with another exemplary embodiment, there is provided a header of an agricultural harvester comprising a frame, a lateral draper belt and a guide assembly. The lateral draper belt assembly is connected to the frame and includes a plurality of rollers, an endless web, a first elongated tongue and a second elongated tongue. The endless web circumscribes the plurality of rollers and defines an inner surface and an outer surface. The first elongated tongue extends from the endless web adjacent to a front edge of the endless web. The second elongated tongue extends from the inner surface of the endless web. The guide assembly includes a first elongated guide and a second elongated guide. The first elongated guide is connected to the frame and has a slot complementarily shaped to receive the first elongated tongue. The second elongated guide is connected to the frame and has a slot complementarily shaped to receive the second elongated tongue.

An aspect of this exemplary embodiment is that the slot of the first elongated guide is defined by three inner surfaces. The slot of the second elongated guide is defined by seven inner surfaces. The slot of the first elongated guide is substantially U-shaped or substantially hook-shaped, and the slot of the second elongated guide is substantially T-shaped.

Another aspect of this exemplary embodiment is that the header further comprises a seal coextensive with the slot of the first elongated guide for forming a sealing connection between the first elongated tongue and the slot. The seal is formed from a plurality of bristles. Additionally, the first elongated guide is substantially coextensive with the endless web. The second elongated guide is substantially coextensive with the endless web. Alternatively, the second elongated guide is formed from a plurality of spaced apart guide segments each having a slot complementarily shaped to receive the second elongated tongue.

Another aspect of this exemplary embodiment is that the lateral draper belt assembly further includes a third elongated tongue and a third elongated guide. The third elongated tongue extends from the inner surface of the endless web. The third elongated guide is connectable to the header and is spaced from and substantially parallel to the second elongated guide. The third elongated guide has a slot complementarily shaped to receive the third elongated tongue.

In accordance with yet another exemplary embodiment, there is provided a guide assembly for a lateral draper belt of a header of an agricultural harvester comprising a first elongated guide and a second elongated guide. The first elongated guide is connectable to the header and has a slot for receiving a first complementary shaped draper belt portion of the lateral draper belt. The slot includes two opposing surface sections and a third surface section connecting the two opposing surface sections. The second elongated guide is connectable to the header and has a slot for receiving a second complementary shaped draper belt portion of the lateral draper belt. The slot includes a first set of opposing surface sections, a second set of opposing surface sections and a third set of opposing surface sections. The second set of opposing surface sections are spaced further apart from each other than the first set of opposing surface sections. One of the surface sections of the third set connects the second set of opposing surface sections.

An aspect of this exemplary embodiment is that the guide assembly further comprises a seal adjacent to the slot of the first elongated guide for forming a sealing connection between the lateral draper belt portion and the slot. Additionally, the guide assembly further comprises a third elongated guide for connecting to the header. The third elongated guide has a slot defined for receiving a third complementary shaped draper belt portion and is spaced from and substantially parallel to the second elongated guide. The slot includes a first set of opposing surface sections, a second set of opposing surface sections and a third set of opposing surface sections. The second set of opposing surface sections are spaced further apart from each other than the first set of opposing surface sections. One of the opposing surface sections of the third set connects the second set of opposing surface sections.

Other features and advantages of the exemplary embodiments of the subject disclosure will be apparent from the following more detailed description.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For purposes of illustration, there are shown in the drawings embodiments, which are exemplary. It should be understood, however, that the exemplary embodiments of the subject disclosure are not limited to the precise arrangements and instrumentalities shown.

In the drawings.

DETAILED DESCRIPTION OF THE INVENTION

Figure 1:
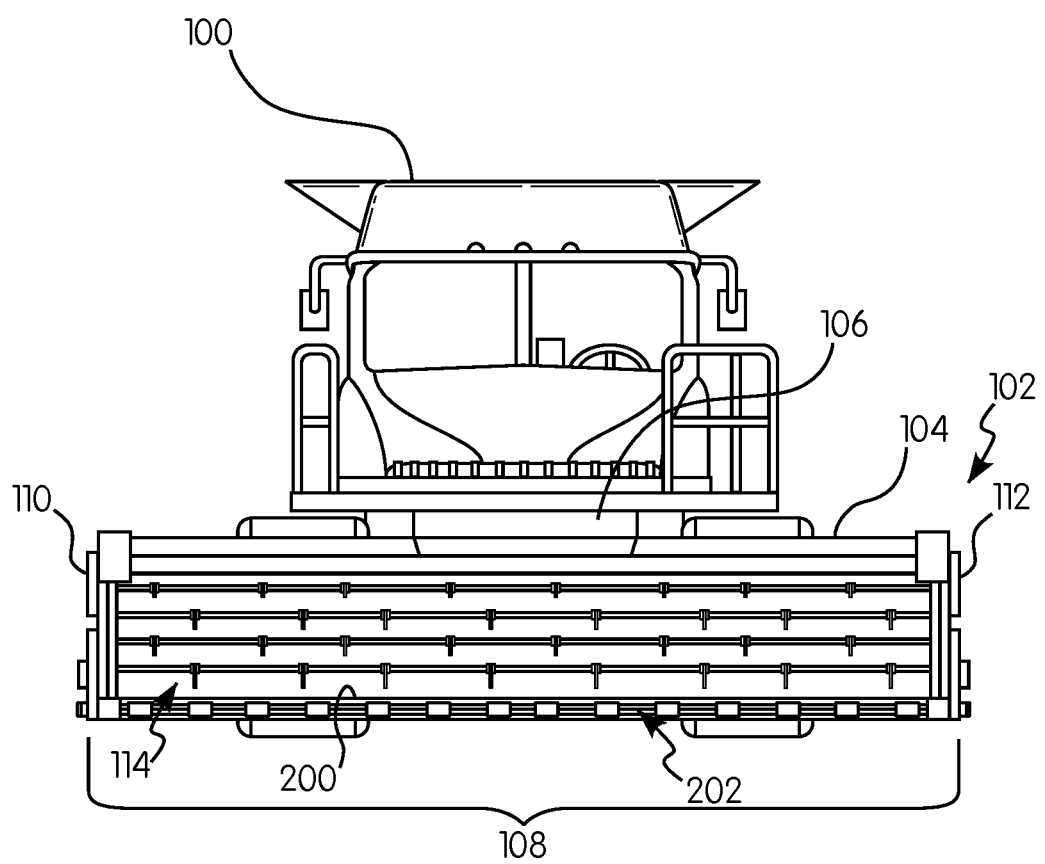
FIG. 1 is a front elevation view of an agricultural harvester including a header in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the exemplary embodiments in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the present disclosure is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the subject disclosure can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the present disclosure may be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings wherein aspects of the subject disclosure are shown, FIGS. 1-6 illustrate an agricultural harvester 100 in accordance with an exemplary embodiment. For exemplary purposes only, the agricultural harvester is illustrate as a combine harvester. The harvester 100 includes a header 102 comprising a frame 104, lateral draper belt assemblies 300A, 300B and a guide assembly having a first elongated guide 500 and a second elongated guide 602A, 602B, 602C.

Figure 2:
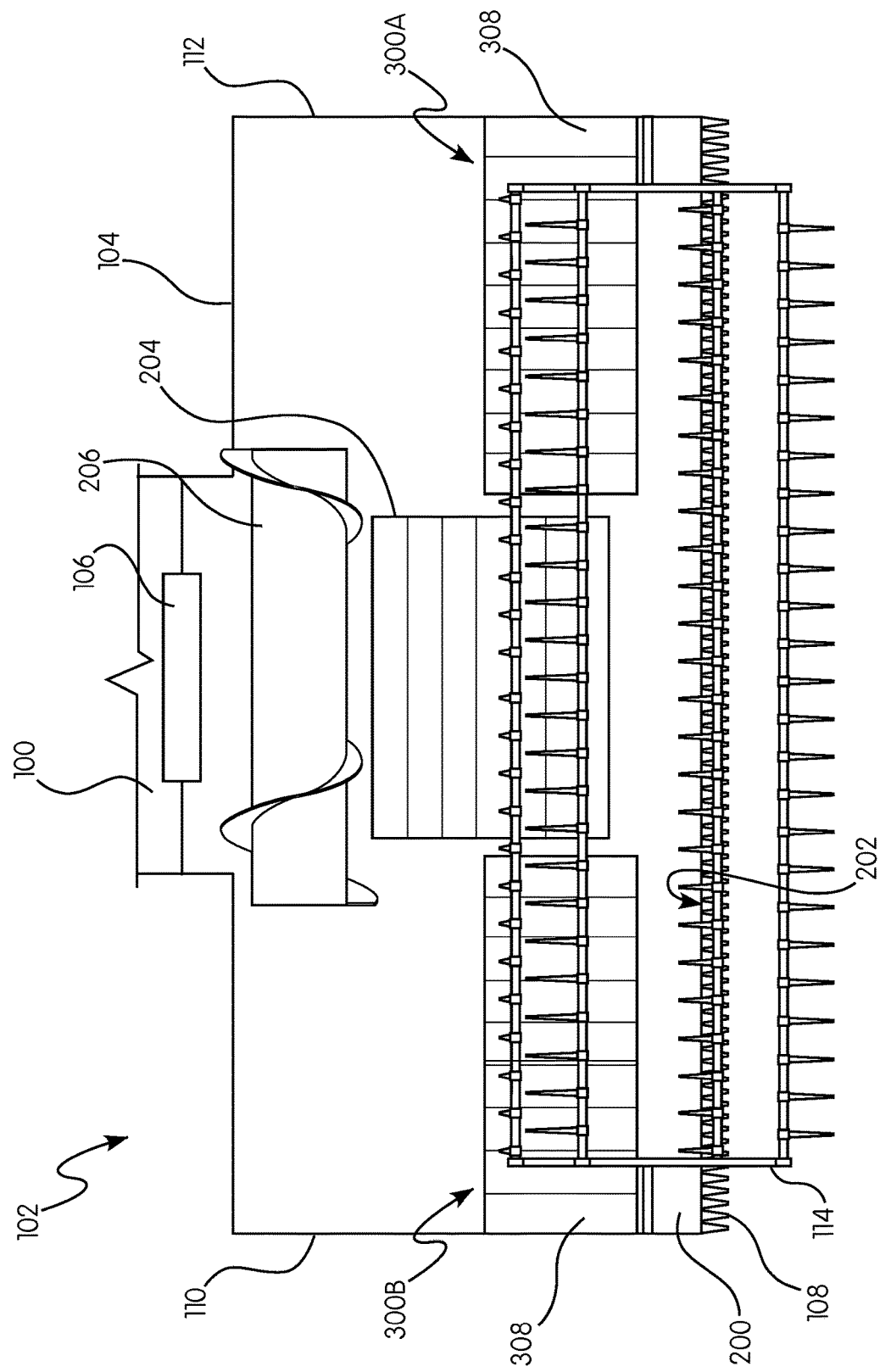
FIG. 2 is a top schematic view the header of FIG. 1 in accordance with an exemplary embodiment.

Referring now to FIGS. 1 and 2, the frame 104 is the structural chassis of the header 102 and allows for the various components of the header 102 to be attached thereto. The header 102 is attached to a forward end of the harvester 100, and is configured to cut crops, including (without limitation) small grains (e.g., wheat, soybeans, grain, etc.), and to induct the cut crops into a feederhouse 106 as the harvester 100 moves forward over a crop field.

The header 102 includes a floor 200 that is supported in desired proximity to a surface of a crop field. The cutter bar 108 of the header 102 extends transversely along a forward edge 202 of the floor 200 i.e., in a widthwise direction of the harvester 100, and is bound by a first side edge 110 and an opposing second side edge 112, which are both adjacent to the floor 200. The cutter bar 108 is configured to cut crops in preparation for induction into the feederhouse 106. It is appreciated that the cutter bar 108 includes one or more reciprocating sickles such as those disclosed in U.S. Pat. No. 8,151,547, the entire disclosure of which is incorporated herein by reference for all purposes. It is appreciated that the cutter bar 108 is configured to be flexible to accommodate changes in terrain as the harvester 100 moves forward over the crop field.

The header 102 may further include an elongated reel 114 which extends above and in close proximity to the cutter bar 108. The reel 114 is configured to cooperate with a plurality of draper belts such as lateral draper belt assemblies 300A, 300B and an infeed draper belt 204 for conveying cut crops to the feederhouse 106. The draper belts 300A, 300B, 204 are configured to convey the cut crops into the harvester 100, and, more specifically, towards the feederhouse 106, for threshing and cleaning. Additionally, the header 102 may include a rotatable auger 206, i.e. a conveyor screw, to facilitate feeding into the feederhouse 106. While the foregoing aspects of the harvester 100 are being described with respect to the header 102 shown, the lateral draper belt assembly 300A and guide assembly of the subject disclosure can be applied to any other header having use for such a lateral draper belt assembly and guide assembly.

Referring now to FIGS. 3-6, the lateral draper belt assembly 300A includes a plurality of rollers 304A, 304B, one or more support members 306A, 306B, 306B, an endless web 308, a first elongated tongue 310 and a second elongated tongue 600A, 600B, 600C. Additionally, the guide assembly includes the first elongated guide 500, the second elongated guide 602A, 602B, 602C and a seal 502.

Figure 3:
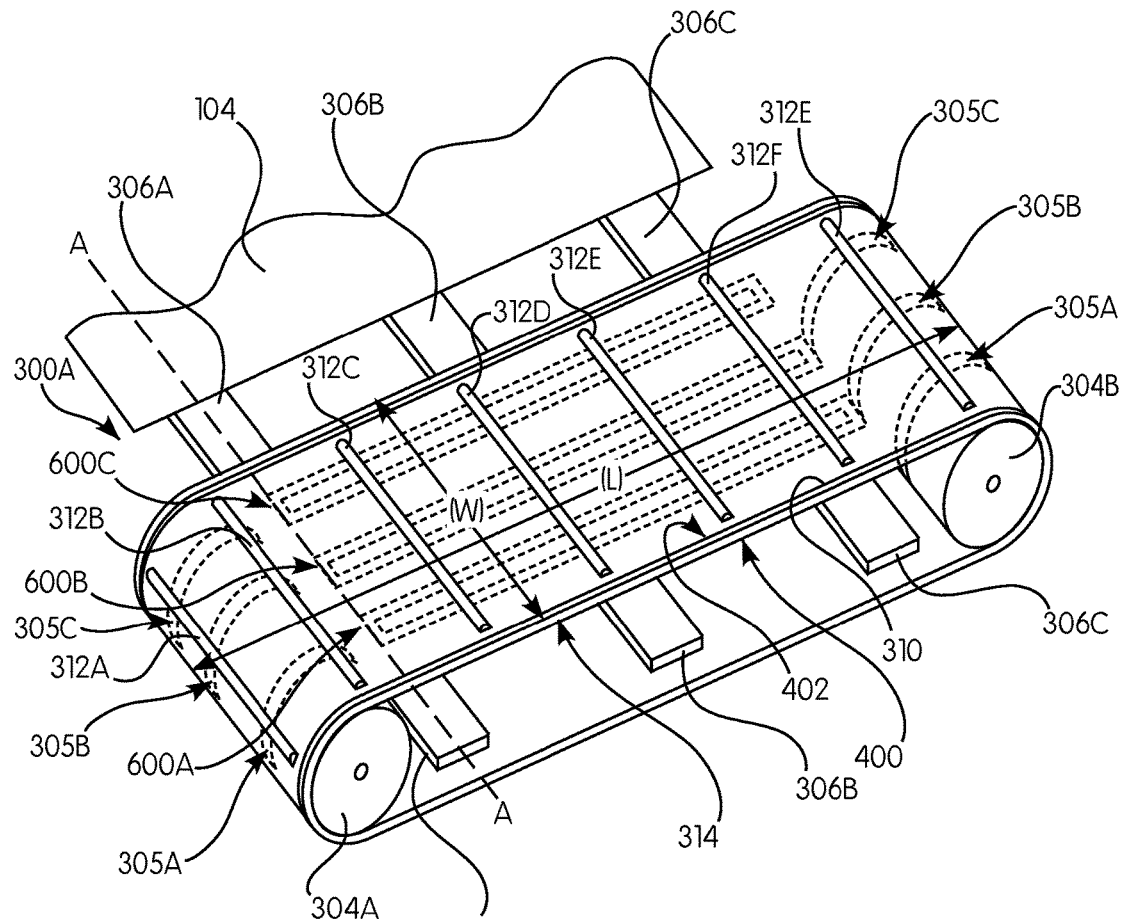
FIG. 3 is a perspective view of a draper belt assembly in accordance with an exemplary embodiment.
Figure 4:
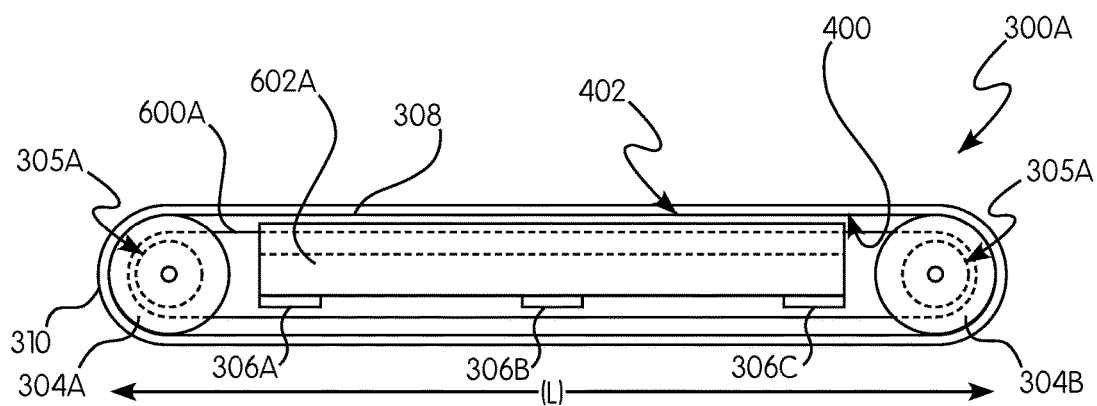
FIG. 4 is a front elevation view of the draper belt assembly of FIG. 3 in accordance with an exemplary embodiment.

Referring now to FIGS. 3 and 4, the plurality of rollers 304A, 304B are configured substantially as shown. The rollers 304A, 304B are rotatable cylinders configured to engage the endless web 308 and to transfer rotational motion from the one of the plurality of rollers 304A, 304B to the endless web 308. In an exemplary embodiment, one of the plurality of rollers 304A, 304B is a drive roller, e.g. roller 304A, configured to receive rotational motion from, e.g., a hydraulic motor, while the other roller is a driven roller, e.g., roller 304B. Additionally, in an exemplary embodiment, the rollers 304 have one or more depressions 305A, 305B, 305C circumscribing the rollers 304A, 304B along a length of the rollers 304A, 304B. The depressions 305A, 305B, 305C are sized, shaped and positioned along the rollers 304A, 304B to permit passage of the second elongated tongue 600A, 600B, 600C as the endless web 308 is rotated about the rollers 304A, 304B.

Referring now to FIG. 3, the support members 306A, 306B, 306C are configured substantially as shown. The support members are elongated members having a first end connectable to the frame 104, either rigidly or pivotably, for providing support to the lateral draper belt assembly 300A. Such support members 306A, 306B, 306C are known in the art and do not necessitate a detailed discussion for the purposes of the subject disclosure. However, an exemplary support member is shown in U.S. Pat. No. 7,926,248, the entire disclosure of which is incorporated herein by reference for all purposes.

Referring now to FIGS. 2-6, the endless web 308 is configured substantially as shown. The endless web 308 is a conveyor belt that extends around the plurality of rollers 304A, 304B and circumscribes the support members 306A, 306B, 306C. When extended around the rollers 304A, 304B, the endless web 308 defines an inner surface 400 and an outer surface 402. The endless web 308 is configured to be rotatable via the plurality of rollers 304A, 304B in a direction suitable for facilitating the induction of cut crops into the feederhouse 106. In other words, the endless web 308 is configured to rotate towards a center of the header 102. Furthermore, the endless web 308 is made of a flexible material such that it can flex to accommodate flexing from the cutter bar 108.

Additionally, in an exemplary embodiment, the endless web 308 includes a series of flights 312A, 312B, 312C, 312D, 312E, 312F and the first elongated tongue 310, i.e., first complementary shaped draper belt portion, and the second elongated tongue 600A, 600B, 600C, i.e., second complementary shaped draper belt portion.

The flights 312A, 312B, 312C, 312D, 312E, 312F extend widthwise (W) across the endless web 308. The flights 312A, 312B, 312C, 312D, 312E, 312F extend marginally outwardly from the outer surface 402 of the endless web 308 to facilitate gripping and transporting the cut crop to the feederhouse 106. It is appreciated that the flights 312A, 312B, 312C, 312D, 312E, 312F can be protrusions, indents, etc., and can be vertically or diagonally aligned with respect to the endless web 308.

Referring now to FIGS. 3-5B, the first elongated tongue 310 is configured substantially as shown. In an exemplary embodiment, the first elongated tongue 310 extends outwardly from the outer surface 402 and substantially along, i.e., adjacent to, a front edge 314 of the endless web 308. The first elongated tongue 310 is sized and shaped to be received by the first elongated guide 500, such as e.g., a tongue or protrusion having a square-like cross-section.

Figure 6:
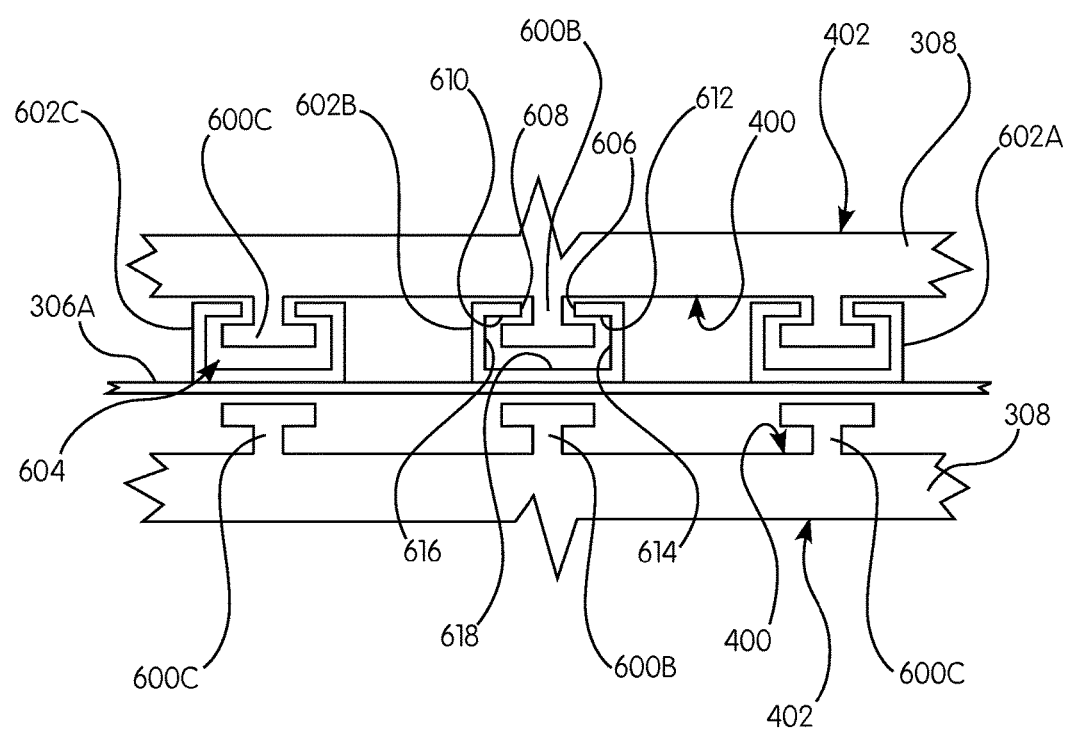
FIG. 6 is a partial side cross-sectional view along A-A in FIG. 3 of a second elongated guide and a second elongated tongue applicable to the header of FIG. 1.

Referring now to FIGS. 4 and 6, the second elongated tongue 600A, 600B, 600C is configured substantially as shown. In an exemplary embodiment, the second elongated tongue 600A, 600B, 600C extends outwardly from the inner surface 400, substantially along a longitudinal length (L) of the endless web 308, and positioned substantially central along the width (W) of the endless web 308. It is appreciated, however, that the second elongated tongue 600A, 600B, 600C can be positioned anywhere along the endless web 308. The second elongated tongue 600A, 600B, 600C is sized and shaped to be received by the second elongated guide 602A, 602B, 602C. In an exemplary embodiment, the second elongated tongue 600A, 600B, 600C is a protrusion having a cross-section shaped like a "T."

It is appreciated that the first and second elongated tongues 310, 600A, 600B, 600C can take any other shapes suitable for being received by a respectively sized slot/guide, such as a curved protrusion, an angled protrusion, a protrusion having indents or an irregular shape, and so forth.

In an exemplary embodiment, the first and second elongated tongues 310, 600A, 600B, 600C are integrally formed with the endless web 308. However, it is appreciated that the elongated tongues 310, 600A, 600B, 600C can be separately attachable to the endless web 308.

Furthermore, in an exemplary embodiment, the first and second elongated tongues 310, 600A, 600B, 600C extend along the entire length (L) of the endless web's 308 outer and inner surfaces 402, 400, respectively. However, it is appreciated that the first and second elongated tongues 310, 600A, 600B, 600C can be segmented or otherwise intermittently dispersed along the longitudinal length (L) of the endless web 308. It is also appreciated that the exemplary embodiments can be practiced with any number of elongated tongues of different sizes and shapes, and does not necessarily require both the first and second elongated tongue 310, 600A, 600B, 600C.

Figure 5A:
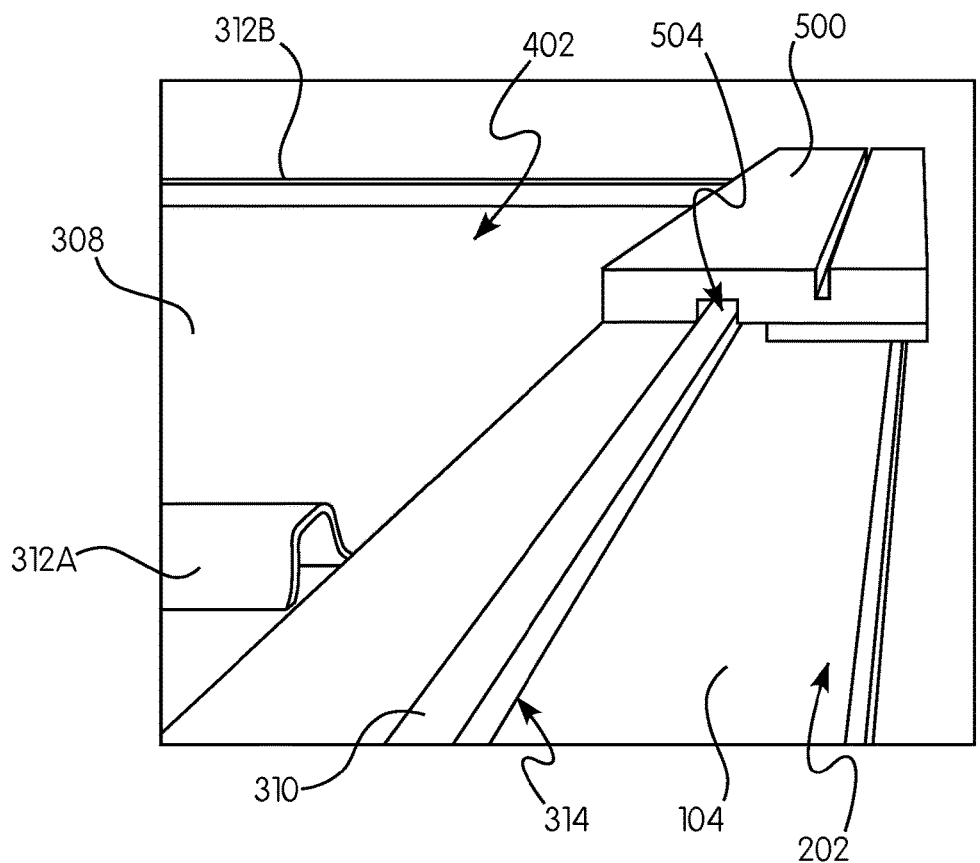
FIG. 5A is a partial perspective view of a first elongated guide and a first elongated tongue applicable to the header of FIG. 1.
Figure 5B:
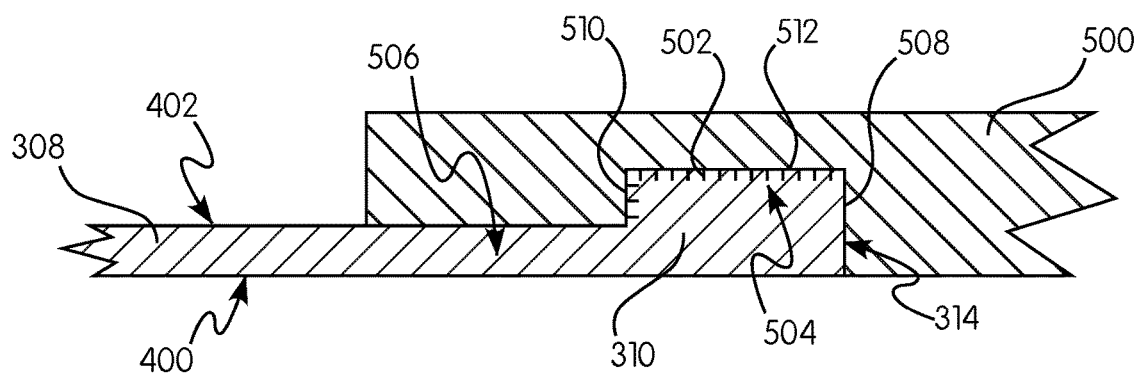
FIG. 5B is a partial side cross-sectional view along A-A in FIG. 3 of the first elongated guide and the first elongated tongue of FIG. 5A.

Referring now to FIGS. 5A and 5B, the first elongated guide 500 is configured substantially as shown. The first elongated guide 500 is connected to the forward edge 202 of the frame 104 and extends over the front edge 314 and outer surface 402 of the endless web 308. In an exemplary embodiment, the first elongated guide 500 is coextensive with the forward edge 202 such that it covers the full length (L) of the endless web 308.

The first elongated guide 500 includes a slot 504 sized and shape to receive the first elongated tongue 310. Specifically, a posterior end of the first elongated guide 500 has a channel or relief 506 sized to receive the endless web 308 without the flights 312A, 312B, 312C, 312D, 312E, 312F. The channel 506 extends inwardly into the slot 504. The slot 504 has an inner surface, or series of inner surfaces 508, 510, 512, e.g., three surfaces or surface sections, opposing one another to create a cavity to receive the first elongated tongue 310. In an exemplary embodiment, the slot 504 includes two opposing surface sections 508, 510, and a third surface section 512 connecting the two opposing surface sections 508, 510. Accordingly, the inner surface sections 508, 510, 512 form a shape accommodating the first elongated tongue 310 such as a square, "U"-shape, hook-shape and so forth. The slot 504 can be sized to marginally fit the first elongated tongue 310 such that a seal-like connection is formed. Alternatively, the first elongated guide 500 can have the seal 502 extending from the inner surfaces sections 508, 510. 512, and can be formed from, e.g., bristles or other applicable materials. The seal 502 functions to prevent debris or other objects from entering the space between the first elongated tongue 310 and the first elongated guide 500.

In other words, the first elongated guide 500 has a slot 504 defined by three inner surfaces 508, 510, 512 for receiving a first complementary shaped draper belt portion, i.e., the first elongated tongue 310, of the lateral draper belt 300A. As such, the slot 504 of the first elongated guide 500 is configured to substantially engage three sides of the first complementary shaped draper belt portion, i.e., the first elongated tongue 310. Furthermore, the guide assembly further comprises a seal 502 coextensive with the slot 504 of the first elongated guide 500 for forming a sealing connection between the lateral draper belt portion, i.e., the first elongated tongue 310, and the slot 504. The seal 502 can be formed from a plurality of bristles. The seal 502 can be adjacent to the slot 504 of the first elongated guide 500 for forming a sealing connection between the lateral draper belt portion, i.e., the first elongated tongue 310, and the slot 504. The first elongated guide 500 can be substantially coextensive with the endless web 308.

Referring now to FIGS. 4 and 6, the second elongated guide 602A, 602B, 602C is configured substantially as shown. The second elongated guide 602A, 602B, 602C is an elongated member having a slot 604. In an exemplary embodiment, the second elongated guide 602A, 602B, 602C extends upwardly from the support members 306A, 306B, 306C. It is appreciated that the second elongated guide 602A, 602B, 602C can instead, or in addition, extend downwardly into the support members 306A, 306B, 306C for forming the slot 604. The second elongated guide 602A, 602B, 602C may be a separate member extending transversely between the support members 306A, 306B, 306C or may extend upwardly from the individual support members 306A, 306B, 306C. As such, the second elongated guide 602A, 602B, 602C can be either substantially coextensive with the length (L) of the endless web 308, or may be interspersed along the length (L) of the endless web.

The slot 604 is sized and shaped to receive the second elongated tongue 600A, 600B, 600C. The slot 604 has an inner surface, or series of inner surfaces 606, 608, 610, 612, 614, 616, 618, e.g., seven surfaces or surface sections, extending inwardly from an upper surface 620 of the second elongated guide 602A, 602B, 602C. In an exemplary embodiment, the slot 604 includes a first set of opposing surface sections 606, 608, a second set of opposing surface sections 614, 616 that are spaced further apart from each other than the first set of opposing surface sections 606, 608, and a third set of opposing surface sections 610, 612, 618. One of the opposing surface sections 618 of the third set connects the second set of opposing surface sections 614, 616 and forms a cavity having a substantially "T" shaped cross-section. In an exemplary embodiment, the slot 604 is sized to allow the second elongated guide some movement within the slot 604 to accommodate changes if/when the endless web 308 flexes.

In other words, the second elongated guide 602A, 602B, 602C has a slot 604 defined by seven inner surfaces 606, 608, 610, 612, 614, 616, 618 for receiving a second complementary shaped draper belt portion, i.e., second elongated tongue 600A, 600B, 600C, of the lateral draper belt 300A. The second elongated guide 602A, 602B, 602C can be substantially coextensive with the endless web 308. The second elongated guide 602A, 602B, 602C can also be formed from a plurality of spaced apart guide segments each having a slot defined by seven inner surfaces, or otherwise having a slot complementarily shaped, for receiving the second complementary shaped draper belt portion, i.e., the second elongated tongue 600A, 600B, 600C, of the lateral draper belt 300A.

It is appreciated that the first and second elongated guides 500, 602A, 602B, 602C can take any other shapes suitable for receiving respectively sized tongues, such as a curved indent, an angled indent, an indent having an irregular shape, and so forth. Further, the first and second elongated guides 500, 602A, 602B, 602C can be made from any material suitable for its intended purpose.

It is also appreciated that the structural shape of the first and second elongated guides 500, 602A, 602B, 602C and the first and second elongated tongues 310, 600A, 600B, 600C can be inversed without deviating from the scope of the subject disclosure. For example, the first and second elongated guides can have protrusions sized and shaped to be received by indents, i.e., slots, in the endless web. Additionally, the exemplary embodiments can have any number of elongated guides and elongated tongues, such as for example with less or more tongues or guides structured and shaped as taught above with respect to the second elongated tongue 600A, 600B, 600C and second elongated guide 602A, 602B, 602C along different portions of the endless web 308. These additional elongated guides and elongated tongues may also be substantially parallel with the second elongated tongue 600A, 600B, 600C and second elongated guide 602A, 602B, 602C.

In other words, the slot 504 of the first elongated guide 500 has a longitudinal cross-section that is substantially U-shaped or substantially hook-shaped, and the slot 604 of the second elongated guide 602A, 602B, 602C has a longitudinal cross-section that is substantially T-shaped. Furthermore, the guide assembly can further comprise a third elongated guide for connecting to the header, the third elongated guide having a slot defined by seven inner surfaces for receiving a third complementary shaped draper belt portion of the lateral draper belt, and wherein the third elongated guide is spaced from and substantially parallel to the second elongated guide. In other words, the lateral draper belt assembly 300A can further include a third elongated tongue extending from the inner surface 400 of the endless web 308, and a third elongated guide for connecting to the header 102, wherein the third elongated guide is spaced from and substantially parallel to the second elongated guide 602A, 602B, 602C and has a slot complementarily shaped to receive the third elongated tongue.

Further, the guide assembly can comprise a third elongated guide for connecting to the header 102, the third elongated guide having a slot defined for receiving a third complementary shaped draper belt portion of the lateral draper belt 300A, and wherein the third elongated guide is spaced from and substantially parallel to the second elongated guide 602A, 602B, 602C. The slot includes a first set of opposing surface sections, a second set of opposing surface sections that are spaced further apart from each other than the first set of opposing surface sections, and a third set of opposing surface sections, wherein one of the opposing surface sections of the third set connects the second set of opposing surface sections.

It is also appreciated that the elongated guides 500, 602A, 602B, 602C and respective elongated tongues 310, 600A, 600B, 600C can be positioned anywhere along/adjacent to the endless web 308. For example, the first elongated guide 500 and first elongated tongue 310 can also be positioned near a back edge opposite the front edge 314 of the endless web 308. Additionally, it is also appreciated that the elongated guides 500, 602A, 602B, 602C and respective elongated tongues 310, 600A, 600B, 600C can be incorporated into the infeed draper belt 204 in a similar fashion as described throughout the specification.

Referring now to FIGS. 1-6, the header 102 is operatively connected to the harvester 100. The lateral draper belt assembly 300A is connected to the frame via the support members 306A, 306B, 306C and extends laterally along the forward edge 202 of the header 102. Specifically, the endless web 308 extends around the plurality of rollers 304A, 304B and the support members 306A, 306B, 306C. The first elongated tongue 310 extends upwardly from the outer surface 402 of the endless web 308 at or about the front edge 314 and into the slot 504 of the first elongated guide 500, which is also connected to the frame 104. The second elongated tongue 600A, 600B, 600C extends downwardly from the inner surface 400 substantially centrally along, or interspersed throughout, the width (W) of the endless web 308. The second elongated tongue 600A, 600B, 600C extends into the slot 604 of the second elongated guide 602A, 602B, 602C located above and/or between the support members 306A, 306B, 306C.

Under this arrangement, as the cutter bar 108 cuts crops and the cut crop is collected onto the lateral draper belt assembly 300A, the crop is prevented from falling between the cutter bar 108 and the endless web 308 by way of the first elongated guide 500. Additionally, the seal 502 of the first elongated guide prevents debris from entering between the slot 504 and the first elongated tongue 310. Furthermore, because the cutter bar 108 can flex, the second elongated guide 602A, 602B, 602C can push or pull the lateral draper belt assembly 300A in unison with the cutter bar 108.

The advantages of having a draper belt assembly that can move and flex with the cutter bar and having a sealing connection between the cutter bar and the draper belt assembly are apparent. Specifically, the sealing connection prevents debris from falling into the gap below the draper belt assembly and behind the cutter bar. If debris were to fall into the gap, then the debris would enter the inner machinations of the header. Such debris can cause significant damage to the harvester and significantly reduce the effectiveness and life of the harvester. Additionally, by creating a guide system for the draper belt assembly to flex with the cutter bar, the cut crops can be more effectively fed into the feederhouse. For example, if the cutter bar is pulled too far or too close to the draper belt assembly, the cut crop would either not reach the draper belt assembly or be placed behind the draper belt assembly where it cannot be collected.

While the subject disclosure has been described with reference to the exemplary embodiments, it will be appreciated by those skilled in the art that various changes may be made and equivalents may be substituted for elements thereof without departing from the scope of the exemplary embodiments. For example, features described in one embodiment may be incorporated into a different embodiment, such as the shape of the draper supports. Additionally, features described in one manner may instead be accomplished by known techniques in the art, such as the methods of making a sealing connection.

In addition, modifications may be made to adapt a particular situation or material to the teachings of the various embodiments without departing from the essential scope thereof. For example, the header can include multiple second elongated guides substantially in line to receive a single second elongated tongue. It is to be understood, therefore, that the exemplary embodiments not be limited to the particular aspects disclosed, but it is intended to cover modifications within the spirit and scope of the embodiments as defined by the appended claims.

We claim:

1. A guide assembly for a lateral draper belt of a header of an agricultural harvester comprising:
    a first elongated guide for connecting to the header, the first elongated guide having a slot defined by three inner surfaces for receiving a first complementary shaped draper belt portion of the lateral draper belt;
    a second elongated guide for connecting to the header, the second elongated guide having a slot defined by seven inner surfaces for receiving a second complementary shaped draper belt portion of the lateral draper belt; and
    a seal coextensive with the slot of the first elongated guide for forming a sealing connection between the first complementary shaped draper belt portion of the lateral draper belt and the slot of the first elongated guide.

2. The guide assembly of claim 1, wherein the slot of the first elongated guide is substantially U-shaped or substantially hook-shaped, and the slot of the second elongated guide is substantially T-shaped.

3. The guide assembly of claim 1, wherein the slot of the first elongated guide is configured to substantially engage three sides of the first complementary shaped draper belt portion.

4. The guide assembly of claim 1, wherein the seal is formed from a plurality of bristles.

5. The guide assembly of claim 1, wherein the second elongated guide is formed from a plurality of spaced apart guide segments each having a slot defined by seven inner surfaces for receiving the second complementary shaped draper belt portion of the lateral draper belt.

6. The guide assembly of claim 1, further comprising a third elongated guide for connecting to the header, the third elongated guide having a slot defined by seven inner surfaces for receiving a third complementary shaped draper belt portion of the lateral draper belt, wherein the third elongated guide is spaced from and substantially parallel to the second elongated guide.

7. A header of an agricultural harvester comprising:
a frame;
a lateral draper belt assembly connected to the frame, the lateral draper belt assembly including:
a plurality of rollers,
an endless web circumscribing the plurality of rollers and defining an inner surface and an outer surface,
a first elongated tongue extending from the endless web adjacent to a front edge of the endless web, and
a second elongated tongue extending from the inner surface of the endless web; and
a guide assembly including:
a first elongated guide connected to the frame, the first elongated guide having a slot complementarily shaped to receive the first elongated tongue,
a second elongated guide connected to the frame, the second elongated guide having a slot complementarily shaped to receive the second elongated tongue; and
a seal coextensive with the slot of the first elongated guide for forming a sealing connection between the first elongated tongue and the slot of the first elongated guide.

8. The header of claim 7, wherein the slot of the first elongated guide is defined by three inner surfaces.

9. The header of claim 7, wherein the slot of the second elongated guide is defined by seven inner surfaces.

10. The header of claim 7, wherein the slot of the first elongated guide is substantially U-shaped or substantially hook-shaped and the slot of the second elongated guide is substantially T-shaped.

11. The header of claim 7, wherein the seal is formed from a plurality of bristles.

12. The header of claim 7, wherein the first elongated guide is substantially coextensive with the endless web.

13. The header of claim 7, wherein the second elongated guide is substantially coextensive with the endless web.

14. The header of claim 7, wherein the second elongated guide is formed from a plurality of spaced apart guide segments each having a slot complementarily shaped to receive the second elongated tongue.

15. The header of claim 7, wherein the lateral draper belt assembly further includes a third elongated tongue extending from the inner surface of the endless web, and a third elongated guide for connecting to the header, wherein the third elongated guide is spaced from and substantially parallel to the second elongated guide and has a slot complementarily shaped to receive the third elongated tongue.

16. A guide assembly for a lateral draper belt of a header of an agricultural harvester comprising:
a first elongated guide for connecting to the header, the first elongated guide having a slot for receiving a first complementary shaped draper belt portion of the lateral draper belt, wherein the slot includes:
two opposing surface sections, and
a third surface section connecting the two opposing surface sections;
a second elongated guide for connecting to the header, the second elongated guide having a slot for receiving a second complementary shaped draper belt portion of the lateral draper belt, wherein the slot includes:
a first set of opposing surface sections,
a second set of opposing surface sections that are spaced further apart from each other than the first set of opposing surface sections, and
a third set of opposing surface sections, wherein one of the opposing surface sections of the third set connects the second set of opposing surface sections; and
a seal adjacent to the slot of the first elongated guide for forming a sealing connection between the first complementary shaped draper belt portion of the lateral draper belt and the slot of the first elongated guide.

17. The guide assembly of claim 16, further comprising a third elongated guide for connecting to the header, the third elongated guide having a slot defined for receiving a third complementary shaped draper belt portion of the lateral draper belt, wherein the third elongated guide is spaced from and substantially parallel to the second elongated guide, and wherein the slot includes:
a first set of opposing surface sections,
a second set of opposing surface sections that are spaced further apart from each other than the first set of opposing surface sections, and
a third set of opposing surface sections, wherein one of the opposing surface sections of the third set connects the second set of opposing surface sections.

* * * * *